United States Patent
Colucci

(10) Patent No.: US 11,010,848 B1
(45) Date of Patent: May 18, 2021

(54) PREDICTING LEGAL MATTER OUTCOME USING ARTIFICIAL INTELLIGENCE

(71) Applicant: Michele Colucci, Redwood City, CA (US)

(72) Inventor: Michele Colucci, Redwood City, CA (US)

(*) Notice: Subject to any disclaimer, the term of this patent is extended or adjusted under 35 U.S.C. 154(b) by 353 days.

(21) Appl. No.: 15/962,740

(22) Filed: Apr. 25, 2018

(51) Int. Cl.
| | |
|---|---|
| *G06Q 50/18* | (2012.01) |
| *G06N 5/04* | (2006.01) |
| *G06N 20/00* | (2019.01) |
| *G06F 40/30* | (2020.01) |

(52) U.S. Cl.
CPC .......... *G06Q 50/182* (2013.01); *G06F 40/30* (2020.01); *G06N 5/046* (2013.01); *G06N 20/00* (2019.01)

(58) Field of Classification Search
CPC ...... G06Q 50/182; G06N 20/00; G06N 5/046; G06F 40/30
USPC ....................................................... 705/311
See application file for complete search history.

(56) References Cited

U.S. PATENT DOCUMENTS

| | | | | |
|---|---|---|---|---|
| 5,875,431 | A * | 2/1999 | Heckman | G06Q 10/04 705/7.16 |
| 7,277,888 | B2 | 10/2007 | Gelormine et al. | |
| 8,010,556 | B2 | 8/2011 | Terrill et al. | |
| 8,498,945 | B1 * | 7/2013 | Remington | G06Q 50/18 705/311 |
| 8,954,343 | B2 | 2/2015 | Wright et al. | |
| 2004/0128148 | A1 | 7/2004 | Austin et al. | |
| 2005/0177614 | A1 | 8/2005 | Bourne | |
| 2006/0059130 | A1 | 3/2006 | Weiss et al. | |
| 2006/0136498 | A1 | 6/2006 | Insley | |
| 2006/0229999 | A1 * | 10/2006 | Dodell | G06Q 10/10 705/80 |
| 2007/0073803 | A1 | 3/2007 | Terrill et al. | |
| 2012/0226701 | A1 | 9/2012 | Singh | |
| 2013/0035912 | A1 | 2/2013 | Margines | |
| 2013/0246290 | A1 * | 9/2013 | Courson | G06Q 10/10 705/311 |
| 2013/0297540 | A1 * | 11/2013 | Hickok | G06N 3/0472 706/21 |
| 2015/0113067 | A1 | 4/2015 | Taylor et al. | |
| 2015/0127638 | A1 | 5/2015 | Parks et al. | |
| 2015/0150100 | A1 | 5/2015 | Soni et al. | |
| 2019/0197442 | A1 * | 6/2019 | Lu | G06Q 10/0635 |

OTHER PUBLICATIONS

Berman and Hafner, "The Potential of Artificial Intelligence to Help Solve the Crisis in Our Legal System," Communications of the ACM, vol. 32, No. 8, published Aug. 1989. (Year: 1989).*

(Continued)

*Primary Examiner* — Richard W. Crandall
(74) *Attorney, Agent, or Firm* — Perkins Coie LLP

(57) ABSTRACT

The present disclosure contemplates a variety of improved methods and systems for providing predicted outcomes which can include suggested strategies for pursuing legal matter resolution. Machine learning algorithms and artificial intelligence can analyze information from a plurality of data sources to determine important factors and dynamically adjust the weights of the information received to provide accurate predictions.

20 Claims, 9 Drawing Sheets

(56) References Cited

OTHER PUBLICATIONS

McGinnis, John O. and Russell G. Pearce, "The Great Disruption: How Machine Intelligence Will Transform the Role of Lawyers in the Delivery of Legal Services," Fordham Law Review, vol. 82, Issue 6, Article 16, pp. 3041-3066. 2014. (Year: 2014).*
Ashley, Kevin D. and Stefanie Bruninghaus, "Automatically classifying case texts and predicting outcomes," [online] Published 2009. Available at: < https://link.springer.com/article/10.1007/s10506-009-9077-9 > (Year: 2009).*
Cappello, Nile, "Dining Apps That set up you to eat With Strangers", www.huffpost.com, HuffPost Life, Oct. 1, 2013, 2013, 2 pages.

* cited by examiner

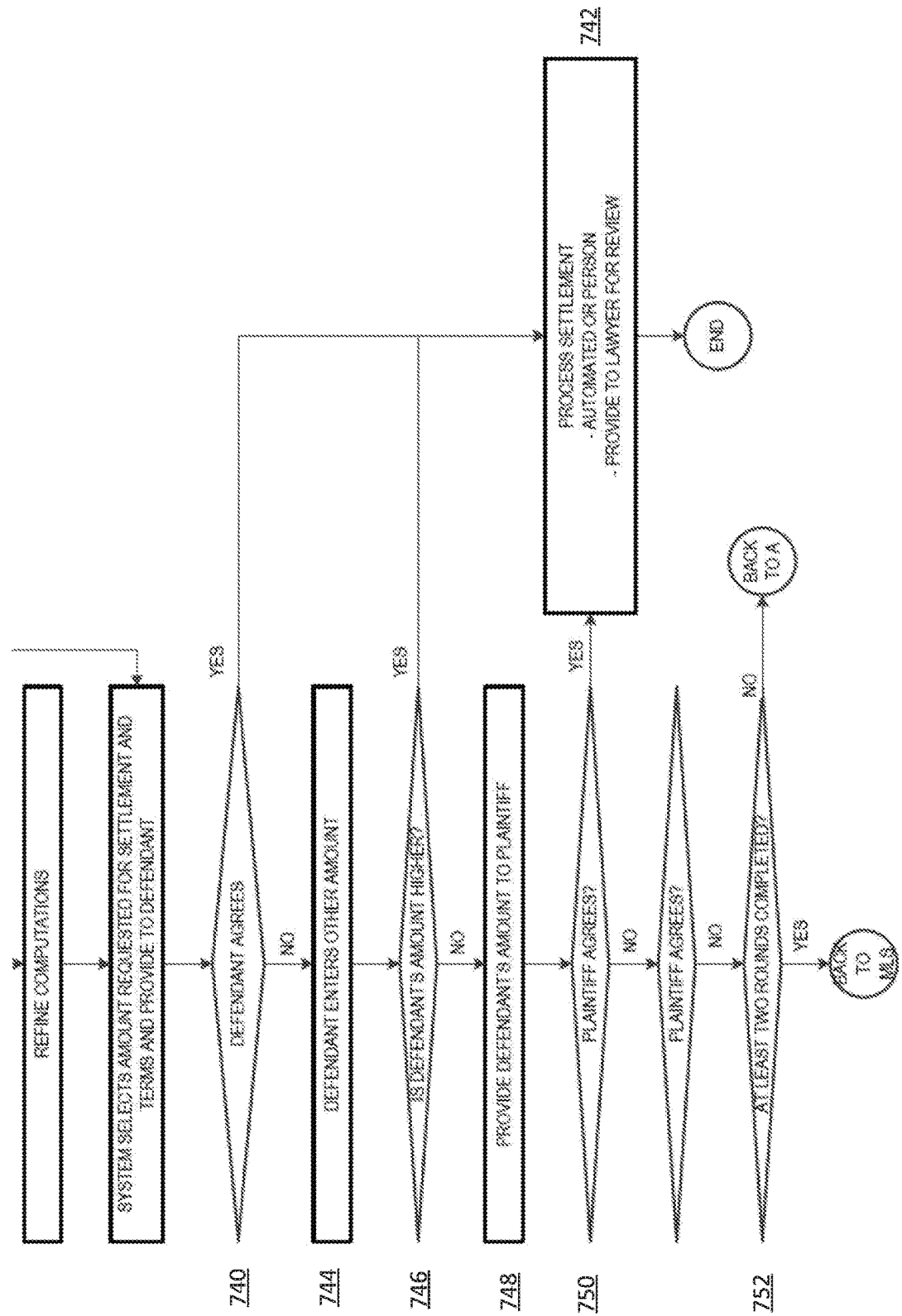

PREDICTING LEGAL MATTER OUTCOME USING ARTIFICIAL INTELLIGENCE

TECHNICAL FIELD

The present disclosure contemplates a variety of improved methods and systems for analyzing matter information and associated factors to predict an outcome and/or recommend a course of action for a legal matter.

SUMMARY

The present disclosure contemplates a variety of improved methods and systems for providing predicted outcomes which can include suggested strategies for pursuing legal matter resolution. Machine learning algorithms and artificial intelligence can analyze information from a plurality of data sources to determine important factors and dynamically adjust the weights of the information received to provide accurate predictions.

Some of the subject matter described herein includes a method for predicting matter outcome using artificial intelligence comprising: receiving matter information representing information provided by a client about a legal matter; determining a matter type using the matter information, the matter type indicative of a type of practice of law related to resolving the legal matter; identifying a predictive model associated with the matter type, the predictive model having a plurality of relevant factors representing elements of the legal matter which are relevant to predicting an outcome to resolve the legal matter, each relevant factor having an associated weight representing an importance of the relevant factor to predicting the outcome of the legal matter; identifying matter data indicative of factual information related to the client and the legal matter from the matter information, the matter data corresponding to a first subset of the plurality of relevant factors; determining a second subset of the plurality of relevant factors which were not identified using the matter information, the second subset of the plurality of relevant factors being relevant to predicting the outcome; identifying external matter data using an external database, the external matter data corresponding to the second subset of the plurality of relevant factors; updating the predictive model using the external matter data associated with the second subset of the plurality of relevant factors; determining a predicted outcome using the predictive model, the matter data and external matter data; and providing the predicted outcome.

Some of the subject matter described herein includes updating the predictive model including adjusting the associated weight; updating the predictive model includes removing a relevant factor of the plurality of relevant factors; or updating the predictive model includes removing a relevant factor of the plurality of relevant factor.

Some of the subject matter described herein includes a system predicting matter outcome using artificial intelligence, comprising: a processor; and memory storing instructions, wherein the processor is configured to execute the instructions such that the processor and memory are configured to: receive matter information representing information provided by a client about a legal matter; determine a matter type using the matter information, the matter type indicative of a type of practice of law related to resolving the legal matter; identify a predictive model associated with the matter type, the predictive model stored in a database and having a plurality of relevant factors representing elements of the legal matter which are relevant to predicting an outcome to resolve the legal matter, each relevant factor having an associated weight representing an importance of the relevant factor to predicting the outcome of the legal matter; identify matter data indicative of factual information related to the client and the legal matter from the matter information, the matter data corresponding to a first subset of the plurality of relevant factors; determine a second subset of the plurality of relevant factors which were not identified using the matter information, the second subset of the plurality of relevant factors being relevant to predicting the outcome; identify external matter data using an external database, the external matter data corresponding to the second subset of the plurality of relevant factors; update the predictive model using the external matter data associated with the second subset of the plurality of relevant factors; determine a predicted outcome using the predictive model, the matter data and external matter data; and provide the predicted outcome.

Some of the subject matter described herein includes a computer program product including one or more non-transitory computer-readable media storing computer program instructions, execution of which by a processor causes the processing system to perform operations comprising: receiving matter information representing information provided by a client about a legal matter; determining a matter type using the matter information, the matter type indicative of a type of practice of law related to resolving the legal matter; identifying a predictive model associated with the matter type, the predictive model having a plurality of relevant factors representing elements of the legal matter which are relevant to predicting an outcome to resolve the legal matter, each relevant factor having an associated weight representing an importance of the relevant factor to predicting the outcome of the legal matter; identifying matter data indicative of factual information related to the client and the legal matter from the matter information, the matter data corresponding to a first subset of the plurality of relevant factors; determining a second subset of the plurality of relevant factors which were not identified using the matter information, the second subset of the plurality of relevant factors being relevant to predicting the outcome; identifying external matter data using an external database, the external matter data corresponding to the second subset of the plurality of relevant factors; updating the predictive model using the external matter data associated with the second subset of the plurality of relevant factors; determining a predicted outcome using the predictive model, the matter data and external matter data; and providing the predicted outcome.

BRIEF DESCRIPTION OF THE DRAWINGS

FIGS. 7A-C illustrate a block diagram for providing negotiations between a plaintiff and a defendant.

DETAILED DESCRIPTION

Legal costs can be prohibitively high for many individuals. Furthermore, many individuals may not know the value of the legal matter, and do not have the skills to research this. Moreover, many factors can affect a success and value of a legal action including the jurisdiction, the judge, characteristics regarding the individual and/or the attorney such as the personality of the individual and/or the attorney or credibility of the individual or the attorney. Other factors can include a change in legislation regarding an applicable law related to legal issues of the legal matter (e.g., changes on the limits of punitive damages). Additionally, the weight of the factors affecting the success and value of a legal action can be changed as new laws and precedential case law becomes available.

This disclosure contemplates a variety of improved methods and systems for providing predicted outcomes to legal matters which can include suggested strategies to resolve the legal matters. These predicted outcomes can be generated using machine learning (ML) capability and artificial intelligence (AI). In at least one embodiment, a predictive model is updated as new relevant information becomes available to provide improved predicted outcomes including litigation outcomes and suggested strategies.

Figure 1:
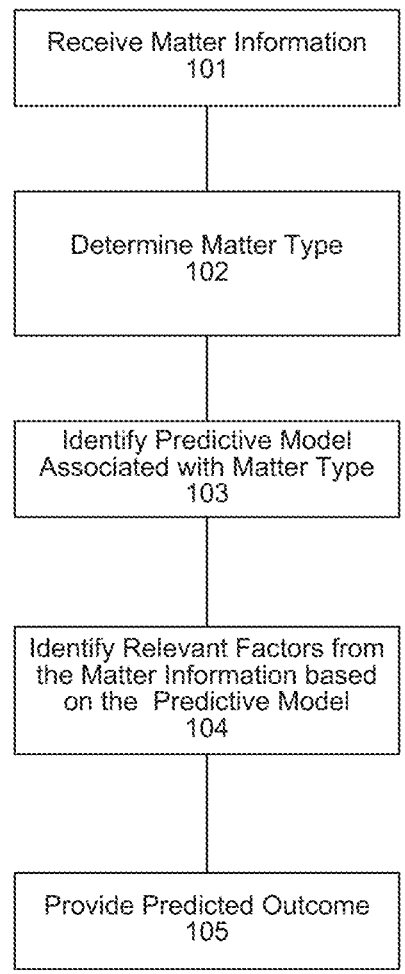
FIG. 1 illustrates a block diagram of processing matter information to predict an outcome.

FIG. 1 illustrates a block diagram of processing matter information to predict an outcome. In at least one embodiment, matter information is received at block 101. Matter information can be matter data entered by a user such as information about a type of legal work, industry of a client, and other information. For example, a patent infringement matter data can include information such as the associated patent attorney name, patent examiner, art unit, patent number, claim language, the patent classification, the infringing product, the infringing company, etc. In at least one embodiment, the user entering the matter data (as matter information) can enter the data in a free text field. In at least one embodiment, the user can record data and transmit the recorded data of matter data. In another example, if a legal matter is a case that is on appeal, then the matter data can be automatically pulled from a database storing matter data of the case when it was in a lower court.

Using the matter information, a matter type can be determined at block 102. The matter type can indicate the type of legal case or law involved with resolving the legal matter that is identified using the matter information. The matter data can be information (e.g., factual information) related to the client and/or legal matter. For example, if the matter data indicates that a patient is injured in a hospital, it can be determined that the matter type is medical malpractice. In another example, if the matter data indicates that an individual slipped and fell, then the matter type can be designated as personal injury. The determination of the matter type can be based on the information entered such as information entered into the text field, and/or a recording. Entered information can be analyzed using a natural language processing algorithm (NLP). Information can also be entered pictorially, for example, by selecting pictures or uploading pictures.

In at least one embodiment, the analysis of the matter information entered can determine that the information is associated with more than one matter type. In at least one embodiment, a certainty weight can be associated with each determined matter type. For example, if the matter information indicates that a person was injured in the hospital then it can be determined that the matter types associated with the matter information are medical malpractice, hospital error, or premises liability matter types. In at least one embodiment the certainty weight can be associated with the matter type, for example, based on the matter information provided it can be determined that the certainty of the matter information indicating that the matter type is medical malpractice is 70% and the certainty of the matter information indicating the matter type is a premises liability matter is 60%. In at least one embodiment, when a certainty weight is below a threshold amount (e.g., 30%, 40%, 50%) it can be determined that the matter type with a certainty weight below the threshold is not the matter type of the matter information provided. For example, if the matter information indicates that a person was injured in the hospital and the certainty weight of the matter type being a constitutional matter is 10%, then it can be determined the constitutional matter type is not the matter type of the matter information. In at least one embodiment, only matter type having the highest certainty weight is associated with the matter information.

Moreover, from the "story" that is told via the matter information, additional matter types can be identified. For example, if the matter information indicates that the person's car hit a light post and the light post fell upon it and that the person's car insurance policy does not pay to fix the resulting damages, then the matter types can include negligence against the light pole company and insurance bad faith against the insurance company. In another example, if a patient goes to a hospital and a doctor operates on the wrong organ, then the matter types can include hospital error or medical malpractice.

In another example, data from the past such as another case can be used. For example, another case might have one claims similar to the claim identified via the matter information. Other claims in that other case can also be identified and suggested as claims for the current case corresponding to the matter information. In one example, if elements (e.g., different facts or information indicated via the matter information) between the current case and the past case are similar, then these different cases might have similar or same claims.

In some embodiments, different past cases might have conflicting claims. For example, one claim in a first past case might not be able to be asserted if another claim in another case was asserted. This can be identified and one of these claims can be selected or recommended as a claim. In some embodiments, the claim from a past case that is from the same court (e.g., the same district court), same level or hierarchy of court, etc. can be used to select one claim and discard another claim from another past case. In another embodiment, characteristics regarding the user (e.g., age, gender, race, etc.) can be determined and similar characteristics of the plaintiffs in past cases can be identified and if there are similarities, then the claims from those cases can be selected rather than claims from other past cases where there are no or fewer similarities. A natural language processing algorithm can include one or more of such morphical segmentation, part of speech tagging, parsing, sentence breaking, word segmentation, terminology extraction, lexical semantics, machine translation, named entity recognition, natural language generation, natural language understanding, optical character recognition, question answering, recognizing textual entailment, relationship extraction, sentiment analysis, topic segmentation and recognition, and word sense disambiguation. Voice recognition can also be employed.

In at least some embodiments the relevancy of information associated with a matter can depend on the matter type. For example, the jurisdiction associated with the matter can be more relevant to a matter related to trade secrets than a matter associated with personal injury. Therefore the one or more predictive models can be associated with a matter. In other words, a different model can exist for trade secret matters and for toxic tort matters. Thus, a trade secret matter might have a first predictive model and a toxic tort matter might have a different, second predictive model. Once a matter type is determined then the relevant matter data can be transferred to the matter type associated predictive model.

In some embodiments multiple matter types can be identified using the matter information. At block 103 of FIG. 1, the predictive model associated with each of the matter types can be used to identify the relevant factors of each matter type and at block 104 the matter information can be analyzed to further identify the relevant factors associated with each identified model. For example, if a matter type of medical malpractice is identified then relevant factors can include the type of injury, name of hospital, age of patients, and severity of injury. If the matter type of premises liability is identified the relevant factors can include the type of injury, name of business, severity of industry, and surface on which injury occurred. Thus, the relevant factors can be elements of the legal matter which can be relevant to predicting or resolving the legal matter. In an example where two matter types are identified (e.g., medical malpractice and premises liability), the matter information can be analyzed to determine the matter data associated with the relevant factors of both of the models (e.g., medical malpractice matter type model and premises liability matter type model). That is, each type of matter can have its own associated relevant factors such that different matter types have different relevant factors.

In at least one embodiment, the predictive model can be used to predict an outcome at block 105. An outcome associated with a predictive model can include a suggested settlement offer, the predicted outcome if the matter were to be tried in a court, a likelihood measure of the settlement offer and/or the predicted outcome.

In one embodiment, sensitivity tables can be graphically generated and presented to reflect the varying predicted outcomes based on the resources used such as what lawyer or lawyers participated with the legal matter, what court the legal matter was or is to be filed in, whether the legal matter was filed in a state or federal court, or what state court that the legal matter was filed in. Thus, the different possibly predicted outcomes can be displayed to a user in an easy-to-digest manner.

Moreover, the predictive model can also vary with the past history of the user or the party that the user is considering litigating against (e.g., a potential defendant). For example, if the potential defendant has in the past never settled and takes all legal matters to court, then certain insights about what it will take to get a resolution can be identified (e.g., that the user would likely have to go to court rather than achieve a settlement). If the potential defendant never loses a case for this matter type, then a value can be ascribed to the probability of success on the merits with this considered. In at least one iteration, details of past cases and outcomes are analyzed and compared with the current facts of the legal matter at issue which are then included in a probability of success index that can be used for the sensitivity tables.

The previous relevant legal matter steps taken by the lawyer representing the defendant can also be analyzed to determine what to expect in the legal matter if the person is to sue the other party. For example, the types of antics likely to be encountered, the types of motions that the other party (e.g., potential defendant) are likely to follow can also be identified and used to provide a predicted outcome.

Figure 2:
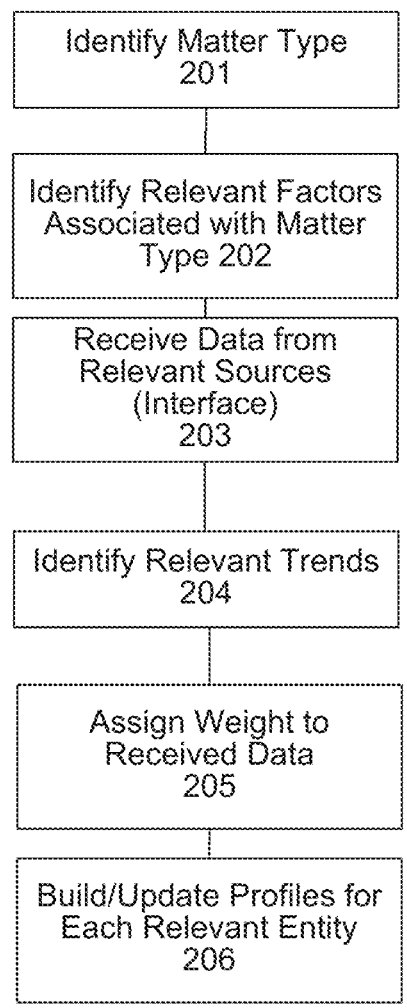
FIG. 2 illustrates the analysis of the matter data using the associated predictive model.

FIG. 2 illustrates the analysis of the matter data using the associated predictive model. At block 201 the matter type can be identified, as previously discussed. The relevant factors associated with the matter type can be identified at block 202. In at least one embodiment questions or input can be provided to the user to learn the relevant matter data, for example by the user providing textual content, scanning handwritten notes, or by providing spoken speech audio. For example if the matter is identified as a patent matter type, the patent number can be identified as a relevant factor. If a patent number is not provided with the matter information, the user can be prompted to input that patent number. Thus, certain types of relevant factors can be determined to be missing from the matter information and the user can be prompted to provide the missing relevant factors. In at least one embodiment relevant factors identified with the predictive model associated with the matter type can be collected at block 203. In at least one embodiment the relevant factors can be identified using the predictive model. The relevant factors of the model can be used to identify the correlated relevant factors of the matter information. In some embodiments at least one correlated relevant factor may not be identified in the matter information and another source can be used to identify the correlated relevant factor. For example, in patents matter types, the patent examiner's name can be a relevant factor as identified by the predictive model. When the patent examiner's name is not found in the matter information, it can be collected from an external database. In at least one embodiment one or more external sources can be used to collect the relevant factors. In at least one embodiment a database can be created which includes a reference of relevant factors and the associated sources from which they can be collected. For example, a database can include an entry indicating that an inventor of a patent can be identified from the United States Patent and Trademark Office (USPTO) patent database.

Furthermore predictive models can be used to identify relevant trends at block 204. In at least one embodiment, when a predictive model is accessed and information is identified, the predictive model can be updated. For example in a patent matter it can be identified that a circuit's 35 United States Code (USC) section 101 decision trends are relevant. In some embodiment an entity profile can be created and/or stored. The entity profile can store the trend information associated with said entity. In the example, a circuit can be represented by an entity profile. Because trends change, the trend information associated with the predictive model can be dynamically updated in at least one embodiment. In at least one embodiment only the trend associated with the relevant entity is updated. For example, if based on the matter information only the second circuit's rulings are relevant then only the trends associated with the Second Circuit are updated. In some embodiments entity profiles can be associated with one or more predictive models.

As discussed above, trends can change. Additionally, legislation can change dynamically. For example, when judges "move" courts (e.g., to a more liberal or conservative position in their political ideology which can influence decisions) this can be identified and used to update the predictive models. When politics or sensitivities to an issue change (e.g., regarding topics such as gun rights, taxes, etc.) this can also be identified and the predictive model can be adjusted to account for these changes. For example, if the trend is to limit punitive damages to $250,000 for certain types of causes of actions of legal matters, then a database tracking court trends can be adjusted. This can provide a person with information regarding what to expect as the time to trial approaches or to determine whether they file, how fast or slow they must file and where to file. Moreover, how the financial outcome will get allocated between the client and the lawyer can also be determined. For example, expected or estimated expenses can be determined and used to determine the allocation of the financial outcome.

The relevant entities can include patent examiners, attorneys, judges, courthouses, etc. In at least one embodiment the trends profile associated with the entity profile is stored. Each entity profile can be associated with one or more trends. In at least one embodiment each entity profile can be associated with one or more other entity profiles at block 206. For example, a judge can be associated with the courthouse. In at least one embodiment entities can be clustered based on the characteristics associated with the entities. For example the decisions of a plurality of judges can be analyzed and it could be determined that a subset of judges will rule in a similar pattern thereby a decision by one judge in a matter can be relevant in determining the matter in which a different judge will rule on a similar case. In at least one embodiment, the plurality of entities are analyzed using a machine learning algorithms and then clusters of entities can be created. In some embodiments the clusters of entities are dynamically updated when new information becomes available. The trend information associated with the one or more entities can also be dynamically updated when new information becomes available. In at least one embodiment, personality information is stored about an entity; this information can be used to predict whether an individual will be successful in interacting with the personality of said entity.

In one example, some judges might be more chauvinistic than others, or have had a personal life experience that informs how they respond to a particular legal matter. For example, a judge in a divorce court who just went through a difficult divorce where his ex-wife attempted to get at the judge's family trust might make the judge more likely to be hostile to any woman trying to claim part of her husband's trust. Thus, the personal experiences of the judge can affect the predicted outcome.

This personality profiling can be based on personal data of judges, personal data of opposing counsel, etc. Further, personalities of the parties, lawyers and judges can be profiled for compatibility, too. For instance, if the Judge is a 60 year old white male who fought for civil rights in the 1960s, then if a person comes into the court with that same profile and age then there is a shared experience which is often expressed in non-verbal ways that creates an affinity to the person—which often results in more favorable rulings for that person. Thus, this can also affect the predicted outcome.

This personality information can also be used to determine what type of person (e.g., legal counsel) that a user would be comfortable working with. For example, the "energy" of a client such as panic, clear thought, linear thinking, or other types of characteristics of the personality of the user can be determined and used to better connect the user to a lawyer who is more compatible with that type of client. Moreover, this can be used to predict the user's tolerance for seeing a legal matter through the end (e.g., through all phases of a trial).

In at least one embodiment the trend profile associated with the entity is deleted after it has not been accessed for a threshold period of time (i.e., a month, two months, a year, etc.). Furthermore, the relevant factors associated with the predictive model can include relevancy weights; in some embodiments multiple relevancy weights are associated with the relevant factors. For example, in a personal injury model the defendant's settlement history can be considered very relevant for the settlement prediction but only moderately relevant for the predicted litigation outcome. In at least one embodiment the relevancy weight of the relevancy factors can be dynamically adjusted based on the information collected. The information collected can include case law, outcomes of previously predicted matters, news reports, legislation or any other relevant information. For example, when the Supreme Court rules on an issue, a circuit judge's past rulings on said issue can be given lower weight in light of the new Supreme Court case.

Figure 3:
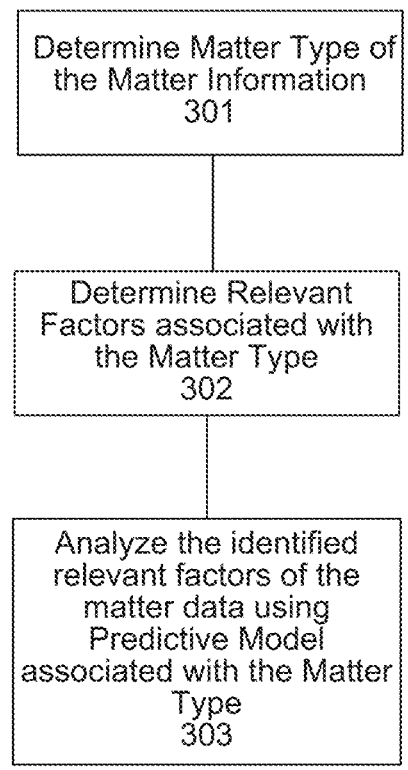
FIG. 3 illustrates an embodiment of the matter type being determined.

FIG. 3 describes an embodiment of determining the matter type. In at least one embodiment the matter information and/or matter data is received. The matter information can include information about a matter such as the details of what happened and relevant information such as dates, locations, parties, etc. The matter information can be received in one or more formats including unstructured format, written content, or auditory content. The matter information can be analyzed to determine a matter type at block 301, as previously discussed. The matter type can be associated with relevant factors at block 302, as previously discussed.

The matter information can be analyzed to determine the relevant factors such as the relevant facts in the body of the text at block 303. In at least one embodiment the matter information is initially analyzed to determine the matter type; then once the matter type is determined the matter data is analyzed according to the associated matter type predictive model which identifies the relevant factors 302. For example, the matter information can be analyzed to determine that the matter type is personal injury. In response to the matter type being identified as personal injury, the relevant factors can be identified in the associated predictive model. In the example, the relevant factors for a personal injury matter, as identified in the associated predictive model, can be location of the injury (i.e., city, state, address, etc.), injured party's name, the injury type. The matter information can be further analyzed to discover whether the relevant factors associated with the predictive model of the case type are disclosed. As an example, the matter information can be analyzed to extract the location of the injury, the injured party's name and injury type. In at least one embodiment the matter data is identified for relevant information prior to the matter type being identified. In at least one embodiment the matter data is analyzed in parallel to additional relevant data is being collected from external sources to increase the processing time.

In one embodiment, the one or more matter types are identified by analyzing matter information. The predictive models associated with the identified one or more matter types can be selected and used to determine the relevant factors associated with the one or more models. The matter information can be analyzed and the relevant factors identified in the matter information. In some embodiments not all relevant factors can be found in the matter information and external sources can be used to identify said information. For example, the litigation history of one of the parties can be identified as relevant, however, that information may not be found in the matter information, therefore an external source can be used to collect said information.

Figure 4:
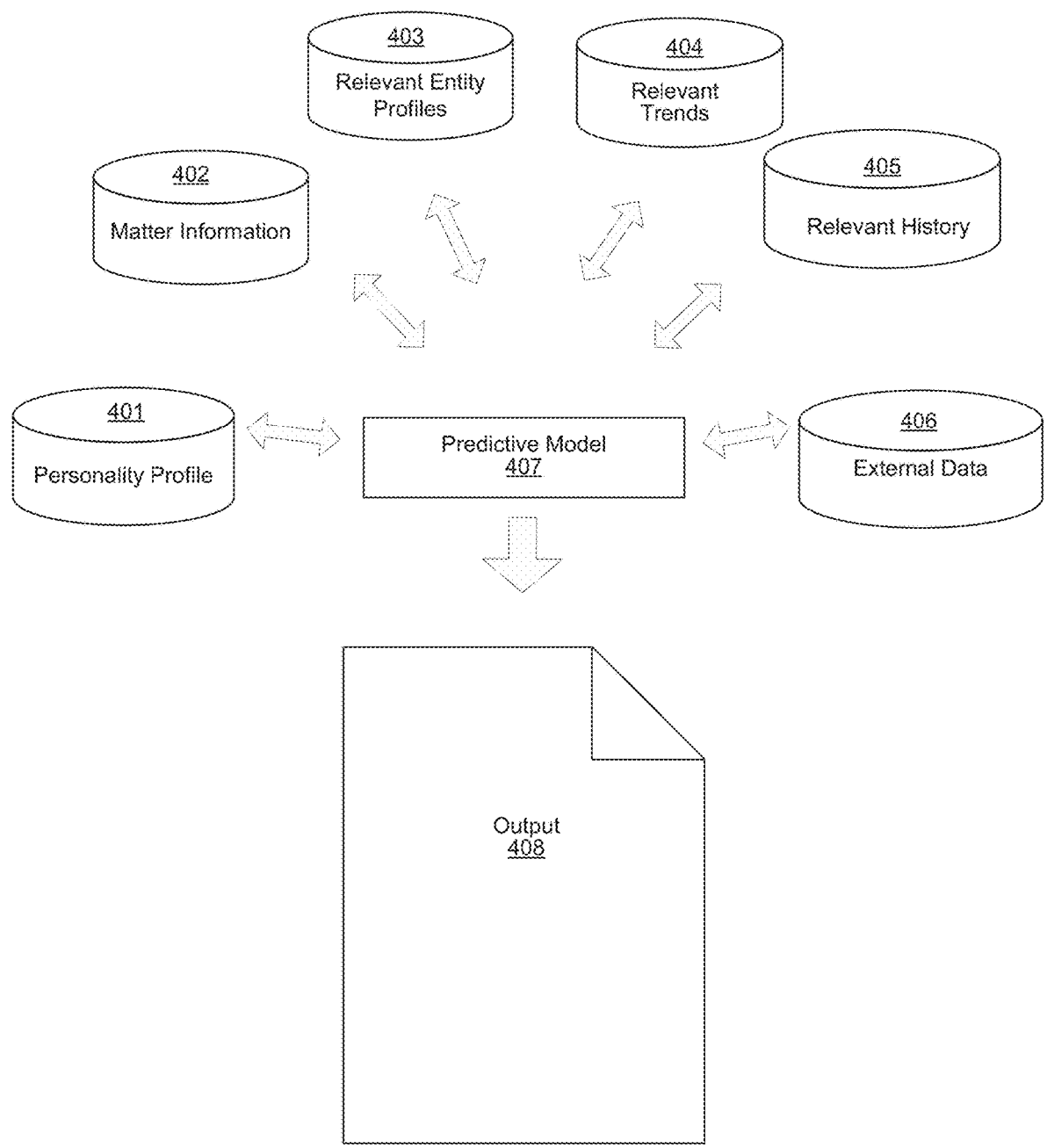
FIG. 4 illustrates an embodiment of the output being generated.

FIG. 4 illustrates an embodiment of the output being generated. Information relevant to the matter can be gathered and output can be generated. Information gathered can include the personality profile 401 of the potential plaintiff and/or defendant. In at least one embodiment a personality profile can be administered to the potential plaintiff and/or defendant. The personality profile can determine traits including the communication style, affability levels, credibility levels, sincerity, and intelligence level. In at least one embodiment, the entered matter information can be analyzed, and a personality profile can be generated based on the matter information. The entered matter information can be analyzed to determine whether the potential plaintiff and/or defendant is entering the data or if it is being entered by another person. For example if the matter information contains the word "I" then it can be determined that the potential plaintiff and/or defendant is entering the data and not a third party. Thus, the content of the matter information provided by the user can be analyzed to determine who is providing the matter information. In at least one embodiment the entered matter information is automatically analyzed to determine if it is being entered by a potential defendant or plaintiff, and if it's determined that it is entered by the potential defendant or plaintiff then generates a personality profile based on the information entered.

Matter information 402 can also be used to predict an outcome of the matter or generate an output. In at least one embodiment the matter information is first analyzed to determine the matter type then based on the relevant factors associated with the matter type determining matter data which can be data that is relevant to the matter. Furthermore the relevant entity profile can be used to generate an output 408. The relevant entities (i.e., lawyer, law firm, judge, court house, etc.) can be identified based on the matter information and/or the predictive model. Entity profile can include personality profiles of said entities such as judges. The personality profiles associated with entities can be generated based on opinions written by the judges, speeches made by the judges, and/or other forms of communication. Additionally the entity profiles can include information about the judge's positions on specific matters, matter types and/or characteristics of matters (i.e., specific legal issues, demographic of parties involved, facts of the case, etc.).

Relevant trends 404 can also be identified relevant trends and can include case law specific to characteristics of the matter. The relevant trend information can be used to adjust the weights of the factors considered in the predictive model 407. The relevant trend information can also be entered as data into the predictive model. The relevant trend information can also be used to update relevant entity profiles. Relevant history 405 can also be considered by the predictive model to determine an output 408. Relevant history can include the information of settlements, damage awards, information about the defendant and/or potential plaintiff's legal history (i.e., settlements, damages, current litigations, etc.). Any other relevant data 406 can also be used by the predictive model to determine an output. Other relevant data can include the income bracket of the potential plaintiff and/or defendant, the browser search history, employment history, criminal history, etc. The other relevant data can be collected when indicated as relevant by a predictive model associated with the matter type.

The generated output 408 can include a predicted outcome if the matter was litigated including an accuracy rating of the prediction. The output can also include recommended attorneys and/or law firms which can be matched to the client and matter. A match can be determined based on several factors such as the personality of the client, lawyer or the defendant. A match can also be based on the similarity of the case to other cases that attorneys have won previously or worked on previously, or even currently working on. This can allow for the match to consider the attorney's experiences. This can be useful for class action cases or other cases in which some expenses (e.g., research costs) can be spread across many cases and, therefore, reduce costs to clients.

The generated output can also include a suggested settlement offer. The settlement offer can include a number of data points including but not limited to the cost of defendant to litigate, the time period over which litigation will likely occur, the time value of that money, the number of lawyers interested in representing the particular client, the success metrics of those lawyers, the success metrics of similar cases, the potential discount likely to be received by upfront settlement, the amount of money potentially saved by resolving the matter, the range of possible settlements with or without the length of time and time value of money and resources incorporated. The potential range of settlements may based on a number of relevant factors, including but not limited to, compilation of factors in that specific case intake ontology, the cost of litigating the case, the success record of prospective counsel, the success metrics in a particular forum such as state, county, federal or state court, etc., the prevalence of expertise available to engage on the matter, success metrics for the particular case type or for a specific lawyer in front of a particular judge, political leanings for or against a particular matter at any specific place and time, cases which reached settlements and/or awards at trial and other factors which may, from time to time, potentially impact the resolution of a particular matter. The settlement offers can also be based on the cost of litigating such matters for the plaintiff and/or defendant. In some embodiments the suggested settlement offer can include a rating of success. The output can include a settlement offer letter and/or report containing information relevant to the settlement and/or a letter which the potential client can send to the potential defendant and/or plaintiff and/or a letter which is automatically generated through the system to the potential defendant. Historic matter resolution information as well as all the factors above, as well as those not yet identified, can be used to generate an output. In some cases, this can also be used for court case intake. For example, the system described herein can be used to lower the work load on courts by providing an output similar to a statement of intended decision.

In at least one embodiment the multiple predictive models can be used to generate an output. In an example where a plurality of causes of action (matter types) are identified using the matter information, a plurality of predictive models associated with said matter types can be used to generate an output. In at least one embodiment the predictive models can be associated with other predictive models and can include an output of the ramifications of combining causes of action. In addition to output for the ramifications of combining the models, output can also be generated from the impact one cause of action will have on the other. For instance, if one key element is resolved by one cause of action which then opens the door to a second cause of action, a potential litigation tree is developed which provides a path and strategy for litigation such that the maximum amount of recovery is possible and the potential of getting to each step is identified in terms of potential percentages of winning at each step. Similarly, output can also take the form of a map that focuses efforts on a chosen metric such as the most lucrative cause of action, the most likely for success cause of action, the least expensive cause of action, etc. Further, toggles can provide sensitivity analyses which can be based on many factors including but not limited to which counsel is chosen, which experts are chosen, where the matter is filed such as state or federal court, and state, county, and in front of what judge the matter is heard.

In some embodiments, the settlement offer can include a monetary value. In some embodiments, a range of monetary values of the settlement can be provided, for example, providing a low point and a high point for the predicted settlement offer. This can provide the user with more insight as to the possibilities of the settlement. Moreover, an allocation of potential settlement funds at various times can also be determined or provided. For example, when a settlement is received when a lawyer has been engaged on the case, not all of the monetary amount goes to the plaintiff. Rather, the settlement's monetary amount is divided among the plaintiff and the lawyers. Thus, the monetary amount that a client can receive might be higher before having lawyers involved in the case.

Figure 5:
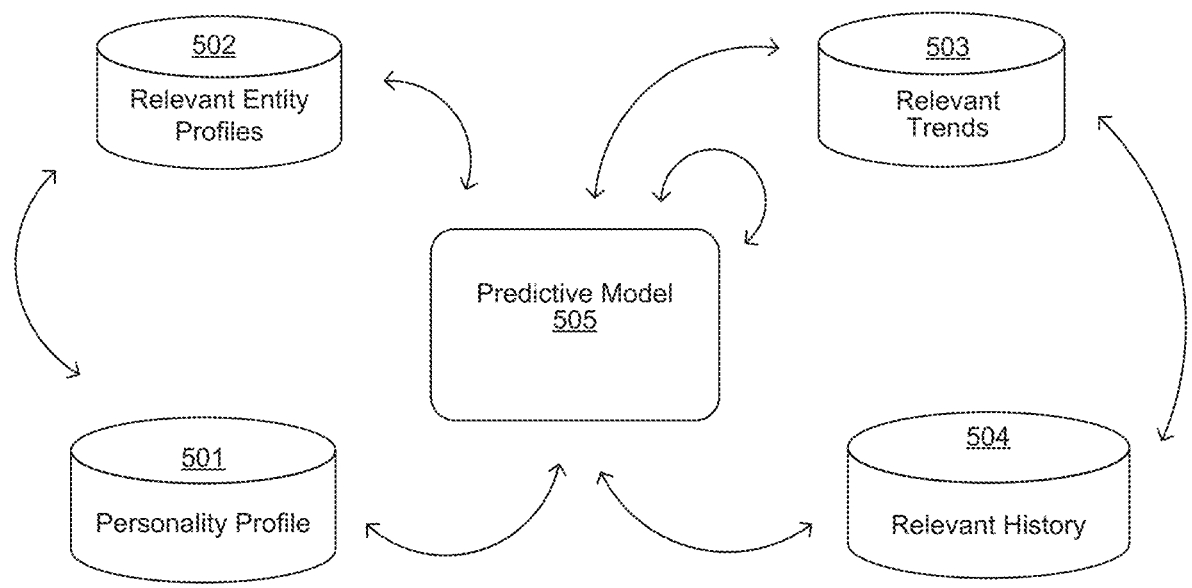
FIG. 5 illustrates an embodiment of predictive model training.

FIG. 5 illustrates an embodiment of training predictive models. In at least one embodiment the predictive models 501 can be trained using available information. In another embodiment the predictive models 501 can be trained using human interaction. In another embodiment the predictive models 501 can be trained using artificial intelligence. The training can include adding or removing relevant factors, and/or adjusting the weights of the relevant factors. For example when information about new case law (e.g., relevant history module 504) and trends (e.g., relevant trend module 503) becomes available, the weights of the relevant factors can be adjusted. If a new case identifies specific elements of a cause of action to be particularly important the predictive model can be updated to include a higher weight to that specific element when determining an outcome. In another example, a new legal test or standard can be identified or created in a case opinion and the factors involved in that legal test (e.g., changes to a standard wherein different factors are to be evaluated or considered to resolve a legal issue as decided by a judge) can result in the adding or removing of relevant factors. Furthermore, if more relevant information is learned about an entity, person or matter, the relevant factors in a predictive model can be adjusted to incorporate the relevance of said information. Additionally in embodiments where the personality profile of the potential client and an entity (judge, lawyer, etc.) are analyzed for compatibility, learning more information about one (e.g., entity profile module 502) can cause the other (e.g., personality profile module 503) to collect additional information. That information can positively or negatively affect outcomes as the data constantly evolves and/or can generate new correspondence to potential defendants if positive for purposes of settling the matter.

Figure 7A:
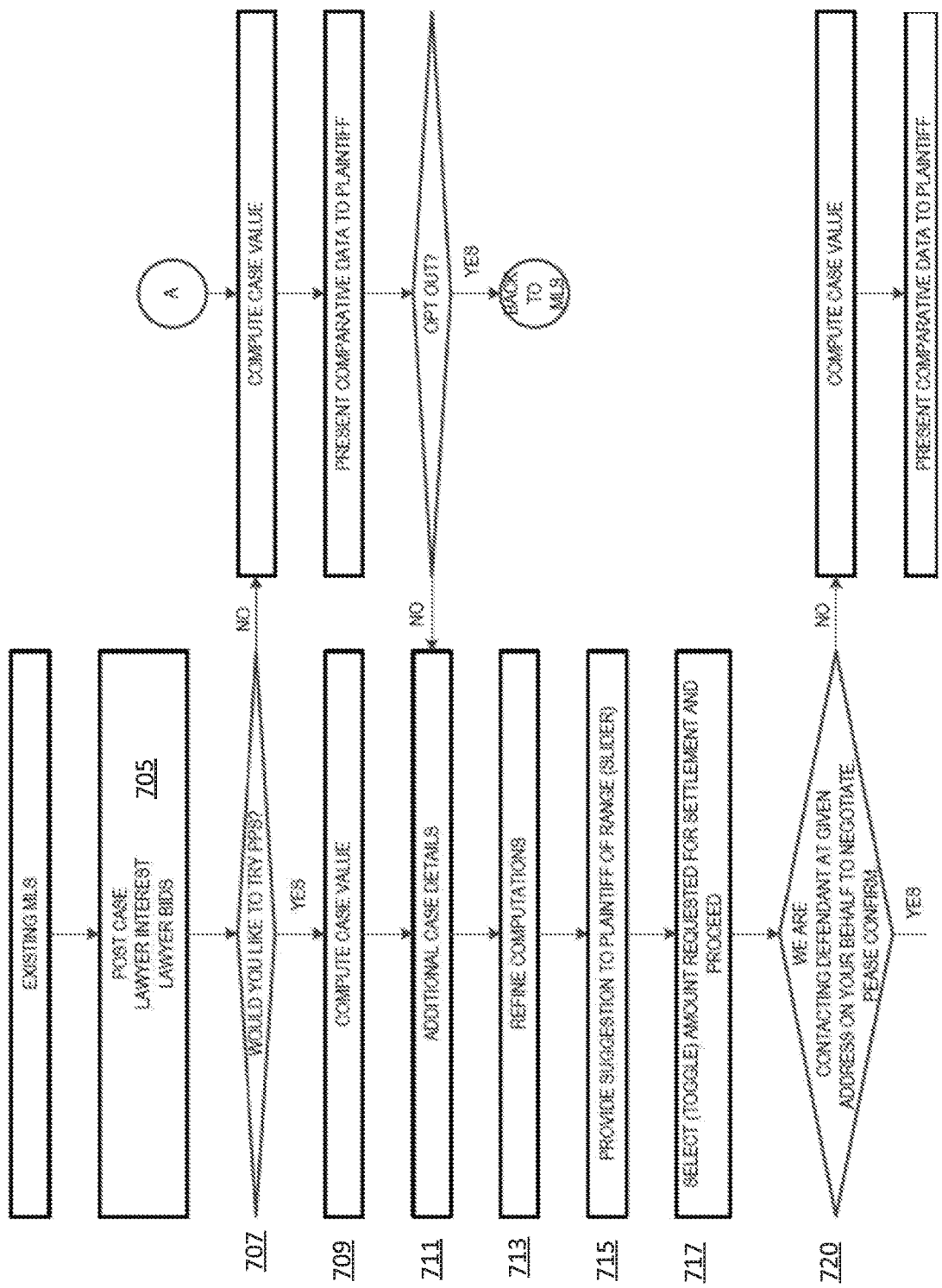
Figure 7B:
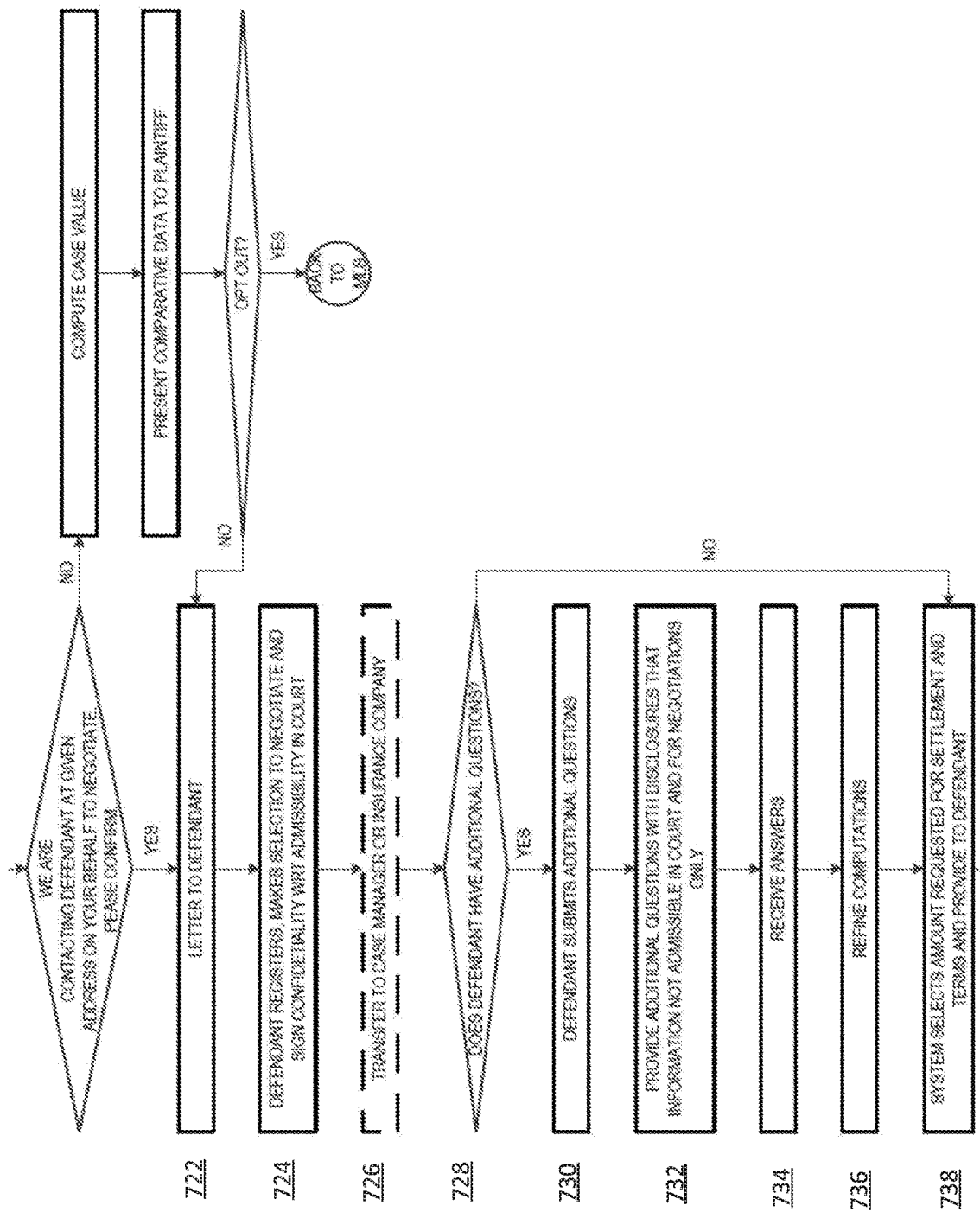

FIGS. 7A-C illustrate a block diagram for providing negotiations between a plaintiff and a defendant. This can also be used by federal or state judiciaries to provide early input for potential litigants. In FIG. 7A, at block 705, a user can post a case to attract interest from lawyers to take on the case via bids. The user can select a lawyer to work with based on the bids, or in some implementations a lawyer can be automatically selected, for example, by providing the best terms (e.g., offering the plaintiff a higher percentage of any monetary settlement than other lawyers), lowest price, etc. At block 707, the user can be requested to determine whether the user wants to try "plaintiff pro se," or a process to try to negotiate a settlement with the defendant that the user (or plaintiff) has designated for their case in a way without resorting to litigation in courts with lawyers. If the user would not like to negotiate a settlement, then a case value for the case can be calculated and comparative data can be presented to the plaintiff indicated by the defendant when posting the case. Alternatively, at block 709, if the user would like to try the plaintiff pro se platform, the case value can be calculated to determine a settlement offer. Additional case details can also be requested at block 711. The additional case details can be a request for a second level of information from when the user posted the case, for example, more details providing more information regarding the case. This request can include questions presented to the user to receive information regarding the matter type. Language translation or processing techniques can be used to determine the matter type based upon the answers provided by the user.

At block 713, computations can be refined based on the user's answers providing the additional case details. This can result in the generation of more information regarding the case including a settlement value. For example, at block 715, the user or plaintiff can be provided a graphical slider to adjust providing a range for a settlement offer based on the computations. At block 717, a server can receive the settlement amount.

At block 720, the defendant as indicated by the user or plaintiff when posting the case can be contacted. In FIG. 7B, at block 722, a letter addressed to the defendant providing some of the information regarding the case (e.g., a description of the incident resulting in the legal claims) can be generated. The letter can be mailed to the defendant, emailed to the defendant, verbally disclosed to the defendant via a computerized phone call, or other communications. The communications can offer a settlement negotiation with the plaintiff. At block 724, the defendant can receive the communications and the defendant can register to negotiate with the plaintiff. This can include signing a confidentiality agreement with respect to admissibility in court. At block 726, in some embodiments, the case can be transferred to a case manager, retired judge, or insurance company based on the claims asserted by the plaintiff. At block 728, the defendant can be prompted whether there are any questions that the defendant might want the plaintiff to answer. If so, at block 730, the defendant can provide the questions and at block 732, these questions can be provided to the plaintiff. At block 734, the plaintiff can answer some or all of these questions. This can result in further refining of the computations at block 736. In some embodiments, disclaimers can be provided at each step to verify that the user wants to provide the any of the aforementioned information or answers because in some situations providing information might result in the user from not being able to claim something else later.

At block 738, based on the computations (which are based on the information provided by the defendant and plaintiff including the answers to the questions), the server can select an amount or range for the settlement and other terms to the defendant.

In FIG. 7C, at block 740, the defendant can agree or disagree to the settlement offered. At block 742, if the defendant agrees, then the settlement can be processed. If the defendant does not agree, then at block 744, the defendant can provided a counteroffer. That is, the defendant can provide a settlement offer that is different than the settlement generated, as discussed above. At block 746, it can be determined whether the defendant's counteroffer is higher. If it is, then the settlement can be processed at block 742. If it is lower, then at block 748, the defendant's settlement can be provided to the plaintiff. At block 750, if the plaintiff agrees, then at block 742 the settlement can be processed in accordance with the defendant's counteroffer. If not then at block 752, other parts of the process can be performed again, as indicated in the block diagram. Thus, an automated negotiation process between the defendant and the plaintiff can be performed without resorting to lawyers and litigation in courts.

Figure 6:
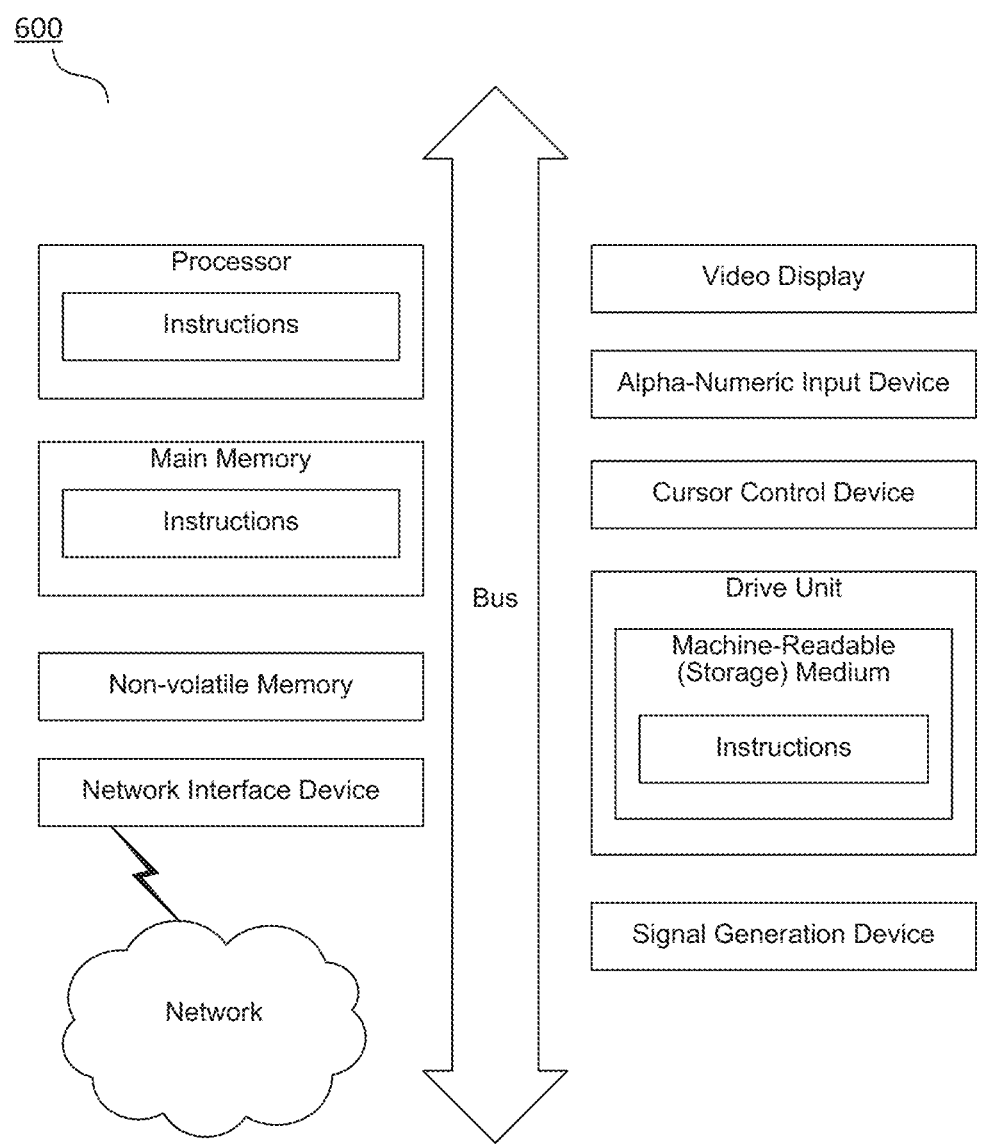
FIG. 6 illustrates an embodiment of a computer system.

FIG. 6 is a diagrammatic representation of a machine in the example form of a computer system 600 within which a set of instructions, for causing the machine to perform any one or more of the methodologies or modules discussed herein, may be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components described in the example of FIGS. 1-5 (and any other components described in this specification) can be implemented. The computer system 600 can be of any applicable known or convenient type. The components of the computer system 600 can be coupled together via a bus or through some other known or convenient device.

This disclosure contemplates the computer system 600 taking any suitable physical form. As example and not by way of limitation, computer system 600 may be an embedded computer system, a system-on-chip (SOC), a single-board computer system (SBC) (for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 600. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serving to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 600. The interface can include an analog modem, ISDN modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 6 reside in the interface.

In operation, the computer system 600 can be controlled by operating system software that includes a file management system, such as a disk operating system. One example of operating system software with associated file management system software is the family of operating systems known as Windows® from Microsoft Corporation of Redmond, Washington, and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer's memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine- readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

I claim:

1. A method for predicting matter outcome using artificial intelligence comprising:
    receiving matter information representing information provided by a client about a legal matter;
    determining a matter type using the matter information, the matter type indicative of a type of practice of law related to resolving the legal matter;
    identifying a predictive model associated with the matter type, the predictive model having a plurality of relevant factors representing elements of the legal matter which are relevant to predicting an outcome to resolve the legal matter, each relevant factor having an associated weight representing an importance of the relevant factor to predicting the outcome of the legal matter;
    identifying matter data indicative of factual information related to the client and the legal matter from the matter information, the matter data corresponding to a first subset of the plurality of relevant factors;
    determining a second subset of the plurality of relevant factors which were not identified using the matter information, the second subset of the plurality of relevant factors being relevant to predicting the outcome;
    identifying external matter data using an external database, the external matter data corresponding to the second subset of the plurality of relevant factors;
    training the predictive model in accordance with an artificial intelligence process by using the external matter data associated with the second subset of the plurality of relevant factors, the training including:
        adjusting a first weight of a first relevant factor corresponding to an element of a cause of action, whereby an increase of the first weight indicates that the element is more determinate of the outcome and a decrease of the first weight indicates that the element is less determinate of the outcome,
        removing a second relevant factor of a first legal issue that has been resolved in a case opinion and adding a third relevant factor of a legal test described in a case opinion, and
        adjusting a fourth relevant factor indicative of compatibility among an entity, person, or matter that can positively or negatively affect the outcome due to continuously changing information of the entity, person, or matter;
    determining a predicted outcome using the trained predictive model, the matter data and external matter data; and
    providing the predicted outcome.

2. The method for predicting matter outcome of claim 1, wherein updating the predictive model includes adjusting the associated weight of one or more of the relevant factors.

3. The method for predicting matter outcome of claim 2, wherein updating the predictive model includes removing one relevant factor of the plurality of relevant factors.

4. The method for predicting matter outcome of claim 2, comprising one relevant factor of the plurality of relevant factors representing a legislative history of an entity.

5. The method for predicting matter outcome of claim 4, wherein the plurality of relevant factors includes one or more of party name, settlement history, or type of injury.

6. The method for predicting matter outcome of claim 2, wherein the predicted outcome includes a predicted cost of litigation or predicted award.

7. The method for predicting matter outcome of claim 2, further comprising:
    determining a settlement offer using the predictive model, the matter data and external matter data; and
    outputting the settlement offer.

8. A computer program product including one or more non- transitory computer-readable media storing computer program instructions, execution of which by a processor causes the processing system to perform operations comprising:
    receiving matter information representing information provided by a client about a legal matter;
    determining a matter type using the matter information, the matter type indicative of a type of practice of law related to resolving the legal matter;
    identifying a predictive model associated with the matter type, the predictive model having a plurality of relevant factors representing elements of the legal matter which are relevant to predicting an outcome to resolve the legal matter, each relevant factor having an associated weight representing an importance of the relevant factor to predicting the outcome of the legal matter;
    identifying matter data indicative of factual information related to the client and the legal matter from the matter information, the matter data corresponding to a first subset of the plurality of relevant factors;
    determining a second subset of the plurality of relevant factors which were not identified using the matter information, the second subset of the plurality of relevant factors being relevant to predicting the outcome;
    identifying external matter data using an external database, the external matter data corresponding to the second subset of the plurality of relevant factors;
    training the predictive model in accordance with an artificial intelligence process by using the external matter data associated with the second subset of the plurality of relevant using the external matter data associated with the second subset of the plurality of relevant factors, the training including:
        adjusting a first weight of a first relevant factor corresponding to an element of a cause of action, whereby an increase of the first weight indicates that the element is more determinate of the outcome and a decrease of the first weight indicates that the element is less determinate of the outcome, removing a second relevant factor of a first legal issue that has been resolved in a case opinion and adding a third relevant factor of a legal test described in a case opinion, and adjusting a fourth relevant factor indicative of compatibility among an entity, person, or matter that can positively or negatively affect the outcome due to continuously changing information of the entity, person, or matter;

determining a predicted outcome using the trained predictive model, the matter data and external matter data; and providing the predicted outcome.

9. The computer program product of claim 8, wherein updating the predictive model includes adjusting the associated weight of one or more of the relevant factors.

10. The computer program product of claim 9, wherein updating the predictive model includes removing a one relevant factor of the plurality of relevant factors.

11. The computer program product of claim 9, wherein one relevant factor of the plurality of relevant factors represents a legislative history of an entity.

12. The computer program product of claim 11, wherein the plurality of relevant factors includes one or more of party name, settlement history, or type of injury.

13. The computer program product of claim 9, wherein the predicted outcome includes a predicted cost of litigation or predicted award.

14. The computer program product of claim 9, wherein causes the processing system to perform operations comprising:

determining a settlement offer using the predictive model, the matter data and external matter data; and outputting the settlement offer.

15. A system for predicting matter outcome using artificial intelligence, comprising:

a processor; and a memory storing instructions, wherein the processor is configured to execute the instructions such that the processor and memory are configured to:

receive matter information representing information provided by a client about a legal matter;

determine a matter type using the matter information, the matter type indicative of a type of practice of law related to resolving the legal matter;

identify a predictive model associated with the matter type, the predictive model stored in a database and having a plurality of relevant factors representing elements of the legal matter which are relevant to predicting an outcome to resolve the legal matter, each relevant factor having an associated weight representing an importance of the relevant factor to predicting the outcome of the legal matter;

identify matter data indicative of factual information related to the client and the legal matter from the matter information, the matter data corresponding to a first subset of the plurality of relevant factors;

determine a second subset of the plurality of relevant factors which were not identified using the matter information, the second subset of the plurality of relevant factors being relevant to predicting the outcome;

identify external matter data using an external database, the external matter data corresponding to the second subset of the plurality of relevant factors;

train the predictive model in accordance with an artificial intelligence process by using the external matter data associated with the second subset of the plurality of relevant factors, the training configured to:

adjust a first weight of a first relevant factor corresponding to an element of a cause of action, whereby an increase of the first weight indicates that the element is more determinate of the outcome and a decrease of the first weight indicates that the element is less determinate of the outcome, remove a second relevant factor of a first legal issue that has been resolved in a case opinion and adding a third relevant factor of a legal test described in a case opinion, and adjust a fourth relevant factor indicative of compatibility among an entity, person, or matter that can positively or negatively affect the outcome due to continuously changing information of the entity, person, or matter;

determine a predicted outcome using the trained predictive model, the matter data and external matter data; and provide the predicted outcome.

16. The system of claim 15, wherein updating the predictive model includes adjusting the associated weight of one or more of the relevant factors.

17. The system of claim 16, wherein updating the predictive model includes removing one relevant factor of the plurality of relevant factors.

18. The system of claim 16, comprising one relevant factor of the plurality of relevant factors representing a legislative history of an entity, wherein the plurality of relevant factors includes one or more of party name, settlement history, or type of injury.

19. The system of claim 16, wherein the predicted outcome includes a predicted cost of litigation or predicted award.

20. The system of claim 16, further comprising:

determining a settlement offer using the predictive model, the matter data and external matter data; and outputting the settlement offer.

* * * * *